(12) United States Patent
Sohr et al.

(10) Patent No.: US 11,938,090 B2
(45) Date of Patent: Mar. 26, 2024

(54) SUBSTRATE HAVING A MARKING ELEMENT, CONTAINER COMPRISING SUCH A SUBSTRATE AND METHOD FOR PRODUCING A SUBSTRATE HAVING A MARKING ELEMENT

(71) Applicant: SCHOTT Pharma AG & Co. KGaA, Mainz (DE)

(72) Inventors: Oliver Sohr, Mainz (DE); Stephan Corvers, Oestrich-Winkel (DE); Christoph Brüning, Kiedrich (DE)

(73) Assignee: SCHOTT Pharma AG & Co. KGaA, Mainz (DE)

(*) Notice: Subject to any disclaimer, the term of this patent is extended or adjusted under 35 U.S.C. 154(b) by 427 days.

(21) Appl. No.: 17/088,155

(22) Filed: Nov. 3, 2020

(65) Prior Publication Data
US 2021/0128410 A1    May 6, 2021

(30) Foreign Application Priority Data
Nov. 4, 2019   (EP) .................................... 19207008

(51) Int. Cl.
*A61J 1/18*   (2023.01)
*A61J 1/03*   (2023.01)
(Continued)

(52) U.S. Cl.
CPC . *A61J 1/18* (2013.01); *A61J 1/03* (2013.01); *A61J 1/05* (2013.01); *C03C 15/00* (2013.01);
(Continued)

(58) Field of Classification Search
CPC . A61J 1/03; A61J 5/18; A61J 2205/50; B23K 26/362; B23K 26/702; B29C 37/00;
(Continued)

(56) References Cited

U.S. PATENT DOCUMENTS

| 8,173,038 B2 | 5/2012 | Wagner |
| 2002/0102362 A1 | 8/2002 | Schneider |

(Continued)

FOREIGN PATENT DOCUMENTS

| JP | 2004-323252 A | 11/2004 |
| KR | 20160063759 A * | 6/2016 |

OTHER PUBLICATIONS

Machine translation of KR 2016-0063759 via EPO (Year: 2016).*
(Continued)

*Primary Examiner* — Laura C Powers
*Assistant Examiner* — Rebecca L Grusby
(74) *Attorney, Agent, or Firm* — Taylor IP, P.C.

(57) ABSTRACT

A substrate includes a first surface area; and a second surface area with a second roughness value. In a height profile of the substrate along a cutting line crossing the first surface area and the second surface area, a height of the substrate along a first section of the height profile is larger than the height of the substrate along a second section of the height profile. In the height profile an absolute value of a height difference between a point of maximum height or an averaged height, respectively, of the second section and a point of minimal height or an averaged height, respectively, of the first section defines a depth value. A ratio of the depth value and the second roughness value is between 2 and 35. A marking element extends across the first surface area and the second surface area.

14 Claims, 8 Drawing Sheets

(51) Int. Cl.
*A61J 1/05* (2006.01)
*B23K 26/362* (2014.01)
*C03C 15/00* (2006.01)
*C03C 23/00* (2006.01)

(52) U.S. Cl.
CPC ....... *C03C 23/0025* (2013.01); *A61J 2205/50* (2013.01); *B23K 26/362* (2013.01)

(58) Field of Classification Search
CPC .......... B41M 5/24; B44C 1/227; B44C 1/228; C03B 33/102; C03B 2215/404; C03C 15/00; C03C 23/0025; C03C 2204/08; Y10T 428/22479; Y10T 428/224521
USPC .................................................. 428/156, 161
See application file for complete search history.

(56) References Cited

U.S. PATENT DOCUMENTS

| | | |
|---|---|---|
| 2005/0218126 A1 | 10/2005 | Leyvraz |
| 2009/0159654 A1* | 6/2009 | Grimard .................. A61J 1/00 235/375 |
| 2013/0273324 A1 | 10/2013 | Moll et al. |
| 2014/0353381 A1* | 12/2014 | Stuck .................. C03C 23/0025 235/494 |
| 2017/0246897 A1 | 8/2017 | Brehm et al. |
| 2017/0340518 A1 | 11/2017 | Logunov et al. |
| 2020/0122873 A1* | 4/2020 | Agerton ................ B65D 1/0215 |
| 2021/0400829 A1* | 12/2021 | Jia ............................ B44C 1/221 |

OTHER PUBLICATIONS

Leech, Patrick W. "Hot Embossing of Microchannels in Cyclic Olefin Copolymers"; doi:10.1557/PROC-1191-OO03-01 (Year: 2009).*
Communication pursuant to Article 94(3) EPC for European Patent Application No. 19 207 008.4 (8 pages).
Machine English translation of Japanese Patent Application No. 2004-323252 (4 pages).
"Glass containers—Resistance to vertical load—Test method", DIN EN ISO 8113, May 2004 (6 pages).
"Glass containers—Internal pressure resistance—Test methods", DIN EN ISO 7458, May 2004 (8 pages).
European Search Report dated May 13, 2020 for European Patent Application No. 19207009 (4 pages).
European Office Action dated Jun. 3, 2020 for European Patent Application No. 19 207 009.2 (6 pages).

* cited by examiner

SUBSTRATE HAVING A MARKING ELEMENT, CONTAINER COMPRISING SUCH A SUBSTRATE AND METHOD FOR PRODUCING A SUBSTRATE HAVING A MARKING ELEMENT

CROSS REFERENCE TO RELATED APPLICATIONS

This application claims priority to European Patent Application 19207008.4 filed on Nov. 4, 2019, which is incorporated in its entirety herein by reference.

BACKGROUND OF THE INVENTION

1. Field of the Invention

The present invention relates to a substrate having a marking element, a container including such a substrate and a method for producing a substrate having a marking element, such as a substrate provided according to the invention.

2. Description of the Related Art

In the state of the art it is common practice to use identification means in order to make objects such as containers identifiable. This aspect is particularly important in the pharmaceutical field where it is often required that containers for holding pharmaceutical compositions, such as vials, syringes, cartridges and the like, have means which allow identifying each single container among others. This can be important, for example, for the purpose of an automation of handling the containers during filling, routing, storing, dispatching as well as for ensuring quality and safety standards which often put high demands on the traceability of each container during its lifetime cycle. Often such identification means are designed in the form of a marking element which is then used in order to fulfill the mentioned requirements.

So far, often a label has been glued on each container and a unique identification code, such as a barcode, has been printed on the label. In other applications, the unique identification code has been transferred directly on the container by a printing process using ink. Thus, both approaches require a printed code. By reading the respective unique identification code, the container can be identified once a link between the container and the unique identification code has been established.

However, gluing labels on the surface or using a printer is often slow and complicated during use, hence, often representing a bottle neck in the production line. The size of these printed codes is usually limited by the printing method and cannot be reduced sufficiently in order to create the required small codes. Particularly for small containers, it is hard or even not possible to provide a sufficiently large area to glue a label onto. Often containers exhibit a complex geometry, which makes it difficult to use labels or printers for the purpose of attaching an identification code to them.

Furthermore, during further handling or use of the containers there is a risk that the labels of the containers peel off or that codes printed directly on the containers using ink vanish, if the containers are exposed to water or other extreme conditions. In addition, it is a general problem that codes provided by these known techniques are subject to fading over time.

These drawbacks lead to the situation that containers cannot be identified anymore, either because the labels have been completely lost or because they are no longer readable, and have to be disposed. This is especially the case in the pharmaceutical field where it is not tolerable that substances of unknown identification are in use. However, particularly in this field, disposing containers comprising respective compositions is quite expensive. Apart from that, sorting out containers whose identification is unclear might lead to downtimes of the system or at least requires extra resources. In any event, using such conventional marking elements might lead to increased service costs.

An even more serious scenario is an incorrect identification and subsequent incorrect assignment of a container due to a vanishing unique identification code. In the worst case, this might lead to serious health risks of the patient.

In the art it is also known to use techniques which allow to provide a marking element directly in the surface of a container, for example by laser ablation techniques or the like. Here, the marking element comprises portions which are graved into the surface (of the container or a substrate in general) and portions which are unprocessed in this regard. Together, the different portions represent the coded information. A marking element provided in that way on the container would indeed be cheap in the production process and would have further advantages with respect to durability. However, for glass containers, such as glass vials, used in the pharmaceutical industry, it is complicated to grave a marking element in the container's surface such that the marking element can be read out later in a reliable way. Indeed, using a conventional barcode scanner often comes along with the problem that the graved marking element could not be recognized on the glass surface due to its transparency. Or in other words, barcode readers often have problems to identify marking elements on the transparent glass surface and accordingly to read out the data thereof.

In light of the problems concerning the read out procedure discussed above, although the marking element graved into the glass surface of a container has significant advantages over for example a label glued on or a code printed directly on, respectively, the surface of a container, the two latter options have nevertheless been preferred.

SUMMARY OF THE INVENTION

Exemplary embodiments provided according to the present invention can overcome the disadvantages described above by providing a substrate having a marking element which on the one hand might be graved into the surface of the substrate which, however, can be read out in a safe, reliable but still fast manner, especially with conventional ways such as barcode scanners. Furthermore, there are no limitations with respect to geometry and size of the substrate. Some exemplary embodiments provided according to the present invention provide a container including such a substrate and also provide a method for producing a substrate having a marking element.

In some exemplary embodiments provided according to the present invention, a substrate includes: a first surface area, the substrate having a first roughness value for a surface roughness of the first surface area; and a second surface area, the substrate having a second roughness value for a surface roughness of the second surface area. In a height profile of the substrate along a cutting line crossing at least in part the first surface area and the second surface area, a height of the substrate along a first section of the height profile corresponding to the first surface area is larger than the height of the substrate along a second section of the height profile corresponding to the second surface area. In the height profile an absolute value of a height difference between a point of maximum height or an averaged height, respectively, of the second section and a point of minimal height or an averaged height, respectively, of the first section defines a depth value. A ratio of the depth value and the second roughness value is between 2 and 35. A marking element extends across the first surface area and the second surface area.

In some exemplary embodiments provided according to the present invention, a container includes a substrate. The substrate includes: a first surface area, the substrate having a first roughness value for a surface roughness of the first surface area; and a second surface area, the substrate having a second roughness value for a surface roughness of the second surface area. In a height profile of the substrate along a cutting line crossing at least in part the first surface area and the second surface area, a height of the substrate along a first section of the height profile corresponding to the first surface area is larger than the height of the substrate along a second section of the height profile corresponding to the second surface area. In the height profile an absolute value of a height difference between a point of maximum height or an averaged height, respectively, of the second section and a point of minimal height or an averaged height, respectively, of the first section defines a depth value. A ratio of the depth value and the second roughness value is between 2 and 35. A marking element extends across the first surface area and the second surface area.

In some exemplary embodiments provided according to the present invention, a method for producing a substrate having a marking element includes: providing the substrate, the substrate having a first surface area, across the first surface area the substrate has a first roughness value for a surface roughness of the first surface area; and removing material from an area of a surface of the substrate using a material-removing-element, hence forming a cavity. The cavity has a second surface area. Removing material from the surface of the substrate is conducted such that across the second surface area the substrate has a second roughness value for the surface roughness of the second surface area. Removing material from the surface of the substrate is further conducted such that in a height profile of the substrate along a cutting line crossing at least in part the first surface area and the second surface area, a height of the substrate along a first section of the height profile corresponding to the first surface area is larger than the height of the substrate along a second section of the height profile corresponding to the second surface area. In the height profile an absolute value of a height difference between a point of maximum height or an averaged height, respectively, of the second section and a point of minimal height or an averaged height, respectively, of the first section defines a depth value. A ratio of the depth value and the second roughness value is between 2 and 35.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
FIG. 1A shows an illustration of a glass substrate having a marking element.

In some exemplary embodiments provided according to the present invention, a substrate has a marking element that extends across at least one first surface area of the substrate and at least one second surface area of the substrate. Across the first surface area the substrate has at least one first roughness value for at least one surface roughness of the first surface area and across the second surface area the substrate has at least one second roughness value for the surface roughness of the second surface area. In at least one height profile of the substrate along at least one cutting line crossing at least in part the first and second surface area, the height of the substrate along a first section of the height profile corresponding to the first surface area is larger than the height of the substrate along a second section of the height profile corresponding to the second surface area. In the height profile the absolute value of the height difference between the point of maximum height or at least one averaged height, respectively, of the second section on the one hand and the point of minimal height or at least one averaged height, respectively, of the first section on the other hand defines a depth value. The ratio of the depth value and the second roughness value is between 2 and 35.

Exemplary embodiments provided according to the present invention are, thus, based on the surprising finding that also transparent substrates, such as glass, can be used in combination with a marking element that has portions graved directly in the surface of the substrate and portions which are unprocessed in this regard, if for the graved portions of the substrate both, geometric parameters as well as surface parameters are controlled. It surprisingly turned out that these parameters significantly affect the optical properties of the respective graved portions for electromagnetic radiation impinging thereon, especially with respect to the amount of electromagnetic radiation which is reflected and/or scattered. Particularly, it seems that the two parameters are correlated with each other.

More particularly, it has been found that the contribution of the graved portions of the marking element to the signal at the receiver end depends strongly on the ratio of the value of the depth of the graved portion and the value of the surface roughness of the surface of that portion. In this regard, it has been found that if the ratio has a value in the range between 2 and 35 the contribution of the graved portions to a signal received in a receiver compared to the contributions from other portions without any graved elements can be significantly increased, hence, an improved contrast of the marking element can surprisingly be achieved.

In some embodiments, the ratio has a value in the range between 2 and 20, such as between 2 and 15, between 3 and 10, between 4 and 15, or between 5 and 10.

Particularly, this way the contrast of the marking element can advantageously be set by simply adapting the respective geometric and surface properties of the graved portions.

This is all the more an astonishing finding, as it seems that said range of values is widely valid independent of the dimensions of the marking element, independent on the concrete glass substrate and independent on the mechanisms used for providing the marking element and for reading the data out from it.

Particularly, employing this approach allows to provide a marking element on a substrate, for example a glass substrate, which may be of a pharmaceutical container such as a vial, with commercially available ways as long as they allow to control the depth and the surface roughness of the graved portions. For example, a laser might be used for accomplishing this task. Accordingly, reading-out of the marking element can be accomplished with commercially available ways as well. For example, conventional barcode scanners can be used for this purpose. Substrates having such marking elements according to this approach, hence, can be used in every existing industrial environment without the need for any adaptions of the facilities. This aspect makes the approach particularly useful and flexible because the existing infrastructure does not have to be retrofitted or otherwise amended.

Thus, controlling the geometric and surface properties ultimately allows setting up a high contrast of the marking element even if it is provided on transparent substrates, such as glass, where read out usually has been complicated. It is acknowledged that a transparent substrate also can be made of polymer such as Cycloolefin-Copolymer (COC) or Cyclic Olefin Polymer (COP).

Especially, no additional elements such as ink, coatings or the like have to be applied to the marking element in order to achieve or ensure the high contrast. This leads to a cheap and fast manufacturing process. Furthermore, there is no risk that anything vanishes over time (such as a coating, which peels off) because there is no material involved which might be subject to any vanishing.

It is acknowledged that if the term "graved portion" (or synonymously the term "cavity") is used herein, it must be understood that the second surface might be equal to or might be at least one part (for example, a central part) of the surface area of that "graved portion", if not stated otherwise in the respective context.

In some embodiments, the second surface area, the second roughness value of which is used in the ratio, is obtained after applying a clipping (see further herein for further information) of 20% or more of the depth value for obtaining topographic data based on which the surface roughness is evaluated, such as 40% or more, 50% or more, or 75% or more of the depth value. In other words, clipping is made beneath the surface at a depth which corresponds to the respective percentage of the depth value.

In some embodiments, the surface roughness is the mean surface roughness or the root mean squared surface roughness, respectively, across at least one part of the respective surface area.

If the surface roughness is defined as the mean surface roughness or the root mean squared surface roughness, a reliable value for the surface roughness might be obtained. This is because local variations of the surface roughness might be flattened out this way. For example, this way the severity of single local variations of the surface roughness to the overall contribution can be significantly reduced. Especially, it is possible to use well-known techniques for evaluation and verification of the roughness value.

Basically, evaluating the roughness value (or the mean value thereof of a certain surface area) might be accomplished by the evaluation of a topographic profile of the respective substrate, especially the graved portions thereof. Particularly, the evaluation takes place after a "preferred" part of the surface of the graved element has been obtained (see further herein for example with respect to clipping).

For example, an optical 3D-profiler might be employed, which allows mapping structures on the surface. This means the profiler has a lateral resolution of up to 0.5 μm, whereby the depth resolution (for example along the z axis) might be much less than 10 nm. Hence, field of views which are appropriate for the sizes of the structures are possible.

For example, the following profiler might be employed:
Manufacturer: ZYGO
Device type: "nexview"
Optical zoom: 0.5× (0.75× and 1.0×) objective lenses: 5.5×, 10×, 20×, and 50× Mirau
Camera: 1024×1024 $px^2$ The application which might be used for evaluation is based on the standard application of the "Mx" software of this type of device.

Now a discussion follows how values for the surface roughness of a certain surface of an element graved in the substrate might be obtained according to one possible approach.

For the evaluation of roughness values of graved elements (more particular the bottom area of the graved element), images of substrate surfaces obtained by white light interferometry (WLI) measurements are processed further as follows:

1. The topographic data from the WLI measurement are levelled with fourth order, whereby surface areas of the substrate which are not part of a graved element are masked out. Hereby it might be also beneficial if a curvature at the surface is removed.
2. The topographic data is clipped at a certain height, for example −0.5 μm beneath the top surface of the substrate. In this step, surface areas without graved elements and borders of the graved elements are removed from the topographic data if they are less than 0.5 μm beneath the top surface. Thus, only the bottom areas of the graved elements remain having a depth of 0.5 μm or more (one might think about them as bottoms of craters). The further evaluation is conducted on this topographic data.
3. The obtained topographic data is again levelled with fourth order.
4. The image of the topographic data is displayed. It might look like a "pan-like" topography.
5. Evaluation of the surface roughness, for example in form of a root mean square value, for one or more graved elements can now be accomplished based on the respective data in the topographic data.

The person skilled in the art understands that the surface area which is available per graved element for evaluation of the respective surface roughness is dependent on the clipping value.

In some embodiments, a graved element is a cavity graved in the substrate.

In some embodiments, a surface area of each graved element which remains for final evaluation after applying the above-described steps might be of the size of 4000-3000 $\mu m^2$. In some embodiments, the first roughness value is lower than the second roughness value by a factor of at least 10, 20, 30, 40, 50, 60, 70, 80, 90 or 100. The first roughness value may be between 0.5 and 20 nm, such as between 1 and 10 nm or between 1 and 5 nm. The second roughness value may be between 5 and 1000 nm, such as between 100 and 700 nm, between 100 and 300 nm, or between 300 and 500 nm.

If in addition to the parameters of the graved portion, also parameters of the non-graved portions are taken into account an even more precise control of the optical properties of the substrate portions, hence, the contrast of the marking element as a whole, can be achieved. It might be also beneficial, alone or in addition, to limit one or more roughness values for, respectively, the second surface areas (especially the graved portions) and the first surface areas (especially the non-graved portions), to a certain range of values which have been proven to be advantageous for an improved contrast.

In some embodiments, a height value is defined by the height in the height profile at the point of maximum height of the first section; wherein the ratio between the height value and the depth value is between 100 and 2000 and/or wherein the height is between 0.1 and 20 mm, such as between 0.5 and 15 mm or between 0.7 and 1.7 mm.

If also the height of the substrate is taken into account, an even more precise control of the optical properties of the substrate portions, hence, the contrast of the marking element as a whole, can be achieved. This is especially the case if the height of the substrate and the depth of the graved portions is limited to a certain range of values which have been proven to be advantageous for an improved contrast.

It is understood by the person skilled in the art that in this application the term "height" (of the substrate) might be used in a synonymous way to the term "thickness" (of the substrate). Accordingly, height profiles might also be understood as thickness profiles. Therefore, if, for example, the substrate having a marking element under consideration is a wall of a container such as a vial, it might be more sensible to use the term "thickness", since the wall of the container (for example, in form of a vial) has a certain thickness. In addition, this way no confusions occur with other "heights" such as the height of the vial.

In some embodiments, the height of the substrate is between 0.1 and 2 mm, such as between 0.6 and 1.7 mm.

In some embodiments, across or beneath the first surface area the substrate has at least one first ratio value for at least one ratio of the concentrations of two materials present in the first surface area or in at least one distinct depth in the substrate beneath thereof; and wherein across or beneath the second surface area the substrate has at least one second ratio value for at least one ratio of the concentrations of the two materials present in the second surface area or in at least one distinct depth in the substrate beneath thereof.

If the ratio of two materials is different for the first and second surface areas (especially the graved and non-graved portions), it surprisingly turned out that the marking element is more durable compared to other embodiments. Here it might be advantageous to evaluate the ratio at the respective surfaces or in a certain depth beneath the surface. This depth might be up to 1200 nm. This depth has been found to be beneficial, because for depths of up to 1200 nm, material concentrations might be subject to notable variations, probably due to the preparation process of the substrate (for example, heat influences, forming, and the like). However, a depth of up to 800 nm or up to 400 nm may also be used. In these depths, the material is even more affected by the preparation processes which lead to changes of concentrations for different materials in the substrate.

In some embodiments, the substrate is designed such with respect to the first ratio value and second ratio value that the hydrolytic durability is improved, especially compared to other substrate designs.

If the two ratios are chosen in an appropriate way, it has been found that the durability with respect to the hydrolytic durability can be significantly improved. This allows providing a marking element which is even more robust against environmental influences.

In some embodiments, (i) the ratio of the concentrations of the two materials is a ratio of the concentrations of the materials B and Si, Na and Si, Ca and Si and/or Al and Si; (ii) the distinct depth is a depth of up to 2 μm, such as up to 1 μm, up to 0.5 μm, or up to 0.2 μm, beneath the respective surface area; and/or (iii) the ratio of the concentrations of the two materials is obtained and/or obtainable by at least one ToF-SIMS measurement, especially of at least one surface layer in the distinct depth, at at least one location of the respective surface area.

Generally, the first and second ratios of concentrations of the two materials are different on, respectively, the first and second surface areas of the substrate than the ratio of the concentrations in the bulk of the substrate (bulk ratio). The bulk ratio can, for example, be measured in a depth of 10 μm. In some embodiments, the second ratio of the concentrations of the two materials reaches 90% of the bulk ratio of the concentrations in a depth which is at most 90% of the depth where the first ratio of the concentrations of the two materials reaches 90% of the bulk ratio of the concentrations. For example, the second ratio of the concentrations of the materials B and Si reaches 90% of the bulk ratio of said materials in a depth which is at most 85% of the depth where the first ratio of the materials B and Si reaches 90% of the bulk ratio of the materials. In other words, the relative amount of B is higher in the graved portions (such as a cavity) than outside the graved portions. Boron increases the hydrolytic resistance of the substrate so that a higher proportion of boron is desirable for the durability of the marking element.

The ratio of two exemplary materials leads to an improved contrast of the marking element. If the distinct depth is chosen appropriate, a more reliable design, hence contrast, is possible.

It is acknowledged that using silicon (Si) as a reference parameter is useful because it has been found that the amount, concentration and distribution of silicon is, compared to other materials in a substrate, especially a glass substrate, quite stable for the portions of the marking element of the second and first surface areas (especially the portions which are graved and which are non-graved). In other words, the amount and concentration as well as the distribution of silicon is not affected by providing a marking element in the substrate. Thus, silicon is an optimal material as a reference marker in measurements of ratios of two materials for comparison purposes between different ratios and/or between different depths of the same ratio.

Using time-of-flight secondary ion mass spectrometry (ToF-SIMS) provides a commercially available and easy to use tool for determining the ratios of the concentrations in a precise manner. Here, the person skilled in the art knows that depending on the sputter time (say 1480 s) a certain depth range (say up to 740 nm) starting from the outer surface of the substrate into the substrate can be evaluated with respect to the ratio. In other words, during applying the time-of-flight secondary ion mass spectrometry more and more material from the substrate is removed from top to bottom, hence, over time material from deeper depths of the substrate is analyzed.

In some embodiments, the substrate comprises at least partly glass, especially silicate glass such as alumosilicate glass and/or borosilicate glass, at least one polymer material such as Cycloolefin-Copolymer (COC) or Cyclic Olefin Polymer (COP).

In some embodiments, the marking element comprises at least one cavity, which may be in form of at least one dot-like and/or line-like element, graved into the substrate. The marking element may comprise a plurality of cavities, such as in the form of a plurality of dot-like and/or line-like elements, graved into the substrate. In some embodiments, (i) the marking element is in the form of at least one matrix code, such as at least one dot matrix code, at least one one-dimensional data code, at least one two-dimensional data code and/or at least one three-dimensional data code, (ii) the first surface area at least in part does not overlap with the surface of the cavity and/or the second surface area is at least one part, such as a central one, of or corresponds to the surface of the cavity and/or (iii) the first surface area is at least one part of the surface corresponding to at least one area of the marking element representing a bit in the marking element which is set to ZERO and/or the second surface area is at least one part of the surface corresponding to at least one area of the marking element representing a bit in the marking element which is set to ONE.

A cavity can be produced in a substrate, especially a glass substrate, by commercially available tools.

In some embodiments, the cavity has alternatively or in addition in at least one dimension an extension of between 1 and 20 µm. For example, it might have a depth of between 1 and 20 µm (particularly with reference to the top site of the substrate) or it might have a plateau-like area which has at least one edge or at least one diameter of between 1 and 20 µm.

In some embodiments, the at least one cavity has alternatively or in addition a design which is dot-like or line-like. In other words, the cavity might be designed as so to say a half sphere-like recess in the substrate or it might be designed like a channel (especially in form of a vertical line) which, respectively, is graved in the surface of the substrate. In some embodiments, more than one cavity might be used as also described herein. It is acknowledged that a graved portion might be understood as a portion having at least one cavity. In some embodiments, a graved portion might be identical to the at least one cavity.

In some embodiments, the depth value is between and/or the maximal or average depth of the cavity is between: 0.1 and 5 µm, such as between 0.1 and 4 µm, 0.1 and 3 µm, 1 and 3 µm, 1 and 2 µm, 1.5 and 2.5 µm, 2 and 3 µm, 2 and 5 µm and/or 3 µm and 5 µm.

If the depth value or the depth of the cavity is limited to a certain range of values which have been proven to be advantageous for an improved contrast, an even more improved result with respect to the read-out reliability might be achieved.

In some embodiments, the marking element has in at least one direction along the surface of the substrate an extension between 0.1 mm and 50 mm, such as between 0.5 mm and 30 mm, between 0.5 mm and 10 mm, or between 0.5 mm and 5 mm, is machine-readable, is or can be produced by at least one laser and/or is or can be produced by at least one etching technique, such as dry etching.

Machine-readable marking elements can be employed in a wide range of industrial applications.

Furthermore, respective lasers are commercially available and the marking elements produced therewith are cheap and durable. An exemplary type of laser is a Diode Pumped Solid State (DPSS) Laser, a fiber laser or a Flash Lamp Pumped Solid State laser. UV lasers might also be used, which may have a wavelength of 250 to 500 nm. They are suitable for ablating techniques since they are fast and reliable and allow fabricating small structures. However, also lasers having a wavelength between 250 and 600 nm might be employed. In some embodiments, a $CO_2$ laser is employed. Dry-etching techniques are also possible for the pharmaceutical field because no contamination must be concerned. Laser ablating techniques and the like might be capable of producing quite small marking elements, for example having a size of 5 mm or even only 1 mm in each dimension the information is encoded in the marking element.

Laser ablating techniques advantageously allow precisely controlling both the depth of the graved portion by controlling the respective ablating time and the roughness of the surface of the respective graved portion by controlling laser parameters such as scanning frequency, laser power, beam width, scanning speed, raw beam width, focal length, fluence, pulse duration and energy, pulse overlap and laser wavelength. Thus, also a precise control of the ratio, hence, of the contrast at the receiver is ensured.

In some embodiments, the first surface area and the second surface area are, especially directly, adjacent to and/or connected with each other.

For example, the first surface area might be the surface area of the unprocessed (i.e. non-graved) substrate (or a portion thereof) and the second surface area might be the surface area of the substrate in the area where it has been graved (or a portion thereof).

In some embodiments, the first and second surface areas are designed such with respect to the first roughness value, the second roughness value and/or the depth value that when a quantity of electromagnetic radiation is emitted by at least one source of electromagnetic radiation towards the first surface area or towards the second surface area, at least one first part or at least one second part of the quantity of the electromagnetic radiation is reflected and/or scattered, respectively, by the first surface area or by the second surface area towards at least one receive. The first part of the quantity is less than the second part of the quantity. The quantity of electromagnetic radiation may be an amplitude figure, the quantity of electromagnetic radiation may be a power figure and/or the first part of the quantity of electromagnetic radiation may be less than a factor of 10, 100, 1000, 10000 lower than the second part of the quantity of electromagnetic radiation.

In some embodiments, (i) the quantity of electromagnetic radiation is emitted towards the first surface area and the second surface area and received by the receiver such that a dark field technique might be employed for evaluation of the first and second part of the quantity and/or (ii) the direction of emittance of the electromagnetic radiation is not parallel or anti-parallel to the direction of reception of the electromagnetic radiation.

In some embodiments, the direction from which the receiver receives the electromagnetic radiation is chosen such that the respective part of electromagnetic radiation does not comprise the direct reflection part of the electromagnetic radiation impinging on the substrate, especially the first and/or second surface area. This allows to take maximal advantage of the selection of the geometric and surface parameters and the respective optical properties.

In some embodiments, the electromagnetic radiation is in the visible, infrared or ultraviolet spectrum, especially emitted by at least one laser, especially at least one UV laser, a Diode Pumped Solid State (DPSS) Laser, a fiber laser or a Flash Lamp Pumped Solid State laser, and/or is radiation in the microwave spectrum.

In some embodiments provided according to the present invention, a container, especially a vial, a syringe tube, a cartridge or another pharmaceutical container, includes a substrate having a marking element, which may be provided as previously described.

Exemplary embodiments provided according to the present invention are thus based on the surprising finding that different types of containers can be provided with a marking element as long as they just comprise a substrate which allows providing a marking element.

In some exemplary embodiments provided according to the present invention, a method for producing a substrate having a marking element, which may be as previously described, comprises the steps of: providing a substrate, especially a glass substrate; the substrate having at least one first surface area, across the first surface area the substrate has at least one first roughness value for at least one surface roughness of the first surface area; providing at least one material-removing-element configured to remove material from at least one surface area of the substrate, the material-removing-element possibly comprising at least one laser such as a UV laser, a Diode Pumped Solid State (DPSS) Laser, a fiber laser or a Flash Lamp Pumped Solid State laser; removing, especially adjacent to the first surface area, by the material-removing-element, material from at least one area of the surface of the substrate, hence, forming at least one cavity, the cavity having at least one second surface area; removing material from the surface of the substrate is conducted such that across the second surface area the substrate has at least one second roughness value for the surface roughness of the second surface area; removing material from the surface of the substrate is further conducted such that in at least one height profile of the substrate along at least one cutting line crossing at least in part the first and second surface area, the height of the substrate along a first section of the height profile corresponding to the first surface area is larger than the height of the substrate along a second section of the height profile corresponding to the second surface area; in the height profile the absolute value of the height difference between the point of maximum height or at least one averaged height, respectively, of the second section on the one hand and the point of minimal height or at least one averaged height, respectively, of the first section on the other hand defines a depth value; the ratio of the depth value and the second roughness value being between 2 and 35.

In some embodiments, the substrate is made of glass.

In some embodiments, the substrate is comprised by a container, such as a vial, which may be made of glass.

In some embodiments, the marking element is a two-dimensional data code.

Further aspects are discussed further herein.

In the context of the present invention, every pharmaceutical composition which the skilled person deems suitable comes into consideration. A pharmaceutical composition is a composition comprising at least one active ingredient. An exemplary active ingredient is a vaccine, an antibody or other biological agent. The pharmaceutical composition may be fluid or solid or both. An exemplary solid composition is granular such as a powder, a multitude of tablets or a multitude of capsules. Another exemplary pharmaceutical composition is a parenteral, i.e. a composition which is intended to be administered via the parenteral route. Parenteral administration can be performed by injection, e.g. using a needle (usually a hypodermic needle) and a syringe, or by the insertion of an indwelling catheter.

Further relevant aspects concerning the container are now described. For the sake of this description, it is assumed that the container, such as the body thereof, may be made of glass. It is furthermore assumed that the container may be in the form of a vial. But, of course, every other type of container might be possible as well.

The above described pharmaceutical glass containers should be characterized by sufficiently high strength, particularly if they are filled in automated capping machines in which substantial axial loads are applied to the vials. Higher axial loads may also be observed when glass vials are used in automated sampling machines in scientific laps or medical institutions as well as during stoppering, shipping, and storage of glass vials. In addition to a certain resistance to axial loads, glass containers should also display sufficiently high burst strength. Burst pressure testing is, for example, appropriate for assessing container strength during lyophilisation to find the weakest point on the interior or exterior surface of a container. Burst strength of pharmaceutical glass containers becomes important if pharmaceutical preparations, after they have been filled in a glass container, are subjected to lyophilisation.

As the use of glass containers in pharmaceutical industry only allows a very low failure probability upon application of mechanical stress or pressure changes, glass containers intended for the filling of pharmaceutical preparations should therefore be characterized by sufficiently high strength, particularly by the ability to withstand high axial loads and by sufficiently high burst strength.

In addition, it should have the ability to withstand a certain pressure in the below described side compression test.

In the pharmaceutical industry, containers are used for the primary packaging of drugs. Among the traditionally most used materials is a glass container, as it ensures stability, visibility, endurance, rigidity, moisture resistance, ease of capping, and economy. The glass containers for medicinal purposes currently on the market include glass containers, made from glass tubing and blow-molded glass containers.

Glass vials that are intended for pharmaceutical packaging must pass numerous mechanical tests. High axial loads that are determined in a so called "vertical compression test" (or also called "axial compression test") may, for example, be required if glass vials are used in automated sampling machines in scientific labs or medical institutions as well as during stoppering, shipping, and storage of glass vials. In addition to a certain resistance to axial loads, glass containers should also display sufficiently high burst strength as determined in the so-called "burst pressure test". Burst pressure testing is, for example, appropriate if pharmaceutical preparations, after they have been filled in a glass container, are subjected to lyophilisation in order to find the weakest point on the interior or exterior surface of a container.

A further mechanical test that is often used to determine the mechanical strength of a glass vial is the so called "side compression test". This test is used, for example, to determine the impact that a certain back pressure may have on the glass vials during transport in a depyrogenation tunnel or generally during transport on a filling line. In this test the glass vials are positioned between an upper and a lower portion of a test tool, wherein a defined load is applied directly onto the body region of the glass vial.

For example, it might be necessary that in a glass vial, especially in an outer surface thereof, tensile stresses exceed a value of 150 MPa to bring the vial to break. The glass container provided according to the present invention may have any size or shape which the skilled person deems appropriate in the context of the present invention. In some embodiments, the top region of the glass container comprises an opening, which allows for inserting a pharmaceutical composition into the interior volume of the glass container. The glass container comprises as container parts a glass tube with a first end and a further end and a glass bottom that closes the glass tube at the further end. In some embodiments, the glass container is of a one-piece design that is prepared by providing a glass tube and by shaping one end thereof (i. e. the end that will be the opening of the glass container) so as to obtain a top region, a junction region, a neck region and a shoulder region followed by a step of shaping the further end of the glass tube so as to obtain a closed glass bottom. An exemplary glass container is a pharmaceutical glass container, such as one selected from the group consisting of a vial, an ampoule or a combination thereof.

The glass of the container may be any type of glass and may consist of any material or combination of materials which the skilled person deems suitable in the context of the present invention. In some embodiments, the glass is suitable for pharmaceutical packaging. In some embodiments, the glass is of type I, such as type I b, in accordance with the definitions of glass types in section 3.2.1 of the European Pharmacopoeia, 7th edition from 2011. Additionally or alternatively, the glass is selected from the group consisting of a borosilicate glass, an aluminosilicate glass, soda lime glass and fused silica; or a combination of at least two thereof. For the use herein, an aluminosilicate glass is a glass which has a content of $Al_2O_3$ of more than 8 wt. %, such as more than 9 wt. %, such as in a range from 9 to 20 wt. %, in each case based on the total weight of the glass. An exemplary aluminosilicate glass has a content of $B_2O_3$ of less than 8 wt. %, such as at maximum 7 wt. %, such as in a range from 0 to 7 wt. %, in each case based on the total weight of the glass. For the use herein, a borosilicate glass is a glass which has a content of $B_2O_3$ of at least 1 wt. %, such as at least 2 wt. %, at least 3 wt. %, at least 4 wt. %, at least 5 wt. %, or in a range from 5 to 15 wt. %, in each case based on the total weight of the glass. An exemplary borosilicate glass has a content of $Al_2O_3$ of less than 7.5 wt. %, such as less than 6.5 wt. %, such as in a range from 0 to 5.5 wt. %, in each case based on the total weight of the glass. In a further aspect, the borosilicate glass has a content of $Al_2O_3$ in a range from 3 to 7.5 wt.-%, such as in a range from 4 to 6 wt. %, in each case based on the total weight of the glass.

A glass which may be provided according to the present invention is essentially free of boron (B). Therein, the wording "essentially free of B" refers to glasses which are free of B which has been added to the glass composition by purpose. This means that B may still be present as an impurity, but at a proportion of not more than 0.1 wt. %, such as not more than 0.05 wt. %, in each case based on the weight of the glass.

Referring now to the drawings, FIG. 1A shows an illustration of a substrate, especially a glass substrate 1, which has a marking element 3. The illustration might be according to an image obtained by a scanning microscope technique. The marking element 3 here is designed in the form of a two-dimensional data code which comprises bits, i.e. "zeros" 5 and "ones" 7, for encoding information as readily known to the person skilled in the art. In general "zeros" are represented in form of unprocessed rectangular surface areas of the substrate 1 while "ones" are represented in terms of processed rectangular surface areas of the substrate 1 as will be described in greater detail below. Each respective rectangular surface area might have the same size, say 80×120 $\mu m^2$ or 100×100 $\mu m^2$. But the rectangular surface areas might be also larger, say 2000-4000 μm or even more per edge (for example 2000×3000 $\mu m^2$).

Figure 1B:
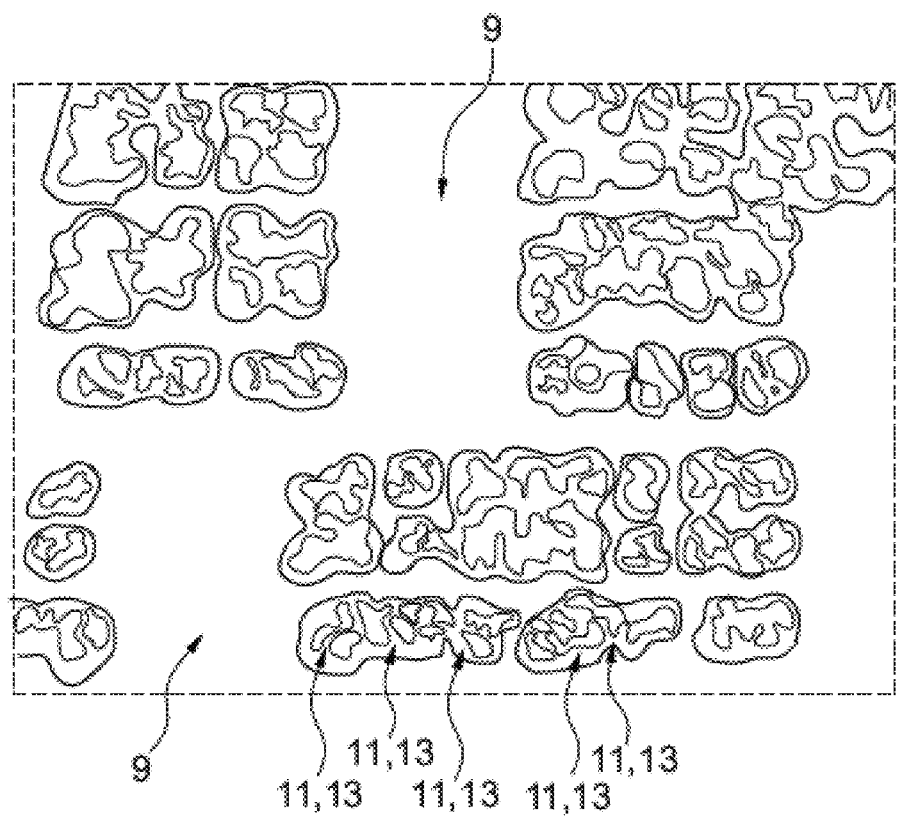
FIG. 1B shows a magnified section of the substrate shown in FIG. 1A.

FIG. 1B shows the area labeled with A in FIG. 1A in a magnified representation. From that it is apparent that the glass substrate 1 comprises a plurality of first surface areas 9 (only some are labeled in the FIG.) which have a surface roughness of a particular first roughness value. A first surface area 9 might be part of the surface area of the substrate which represents a bit set to "zero" or it might also be the entire part of the surface area which represents a bit set to "zero".

The glass substrate 1 comprises also a plurality of second surface areas 11 (only some are labeled in the FIG.) which have a surface roughness of a particular second roughness value. It is particularly noted that each second surface area 11 is at least one part of the surface of a cavity 13 which has been graved in the surface of the glass substrate 1 by a laser ablating technique.

For the substrate 1 shown in FIGS. 1A and 1B, a plurality of cavities (say an array of 4×3=12 cavities) are used in order to indicate a bit set to "one" in the data code. But the person skilled in the art understands that also a single cavity might be used to indicate a bit set to "one" and/or that a single cavity is built in that many cavities are formed in the substrate which cavities have a large overlapping portion so that finally a single large cavity is obtained.

Only in the last case one single cavity represents a bit set to "one". Otherwise, as it is the case for the substrate shown in FIGS. 1A and 1B, a plurality of cavities, i.e. a plurality of second surface areas 11, are used for representing a bit having the value "one".

In the substrate 1 shown in FIGS. 1A and 1B it is obvious that many of the single cavities 13 are merging into each other. However, it is, of course also possible (as also apparent from the FIGS.) that still some pairs of directly adjacent cavities of the cavities 13, which represent a single bit set to "one", do not overlap or merge. As a consequence, between such to at least with respect to each other isolated cavities, also within a surface area representing a bit of value "one" there might be a surface area of the substrate which is unprocessed in terms of lacking any cavity because it is so to say the connecting area between two cavities which both belong to the same "one". However, such an unprocessed surface area is not a first surface area in terms of the present invention. Instead, the first surface area must be understood as at least one part of the surface area which indicates a bit set to "zero".

The concrete realization of the cavities for setting a bit to "one", especially the extent to which they overlap, might be controlled by adapting respective laser parameters such as scanning frequency, laser power, beam width, scanning speed, raw beam width, focal length, fluence, pulse duration and energy, pulse overlap and laser wavelength.

To sum up, it might be said that the marking element 3 shown in FIGS. 1A and 1B extends across a plurality of first surface areas of the substrate (i.e. all the unprocessed areas representing a "zero") and a plurality of second surface areas (i.e. the processed areas in form of cavities 13).

Again, while for the substrate shown in FIGS. 1A and 1B it might be possible to state that a surface area representing a "zero" is a first surface area it is not possible to state that a surface area representing a "one" is a second surface area (because the rectangular surface area representing a "one" here has also parts which are not part of the cavities 13 but which are part of the unprocessed surface area of the substrate 1 between two cavities).

It is acknowledged that the extensions of the marking element 3 is 1 mm in each of the two dimensions of the plane of FIG. 1A.

As will be shown in more detail below with respect to two different exemplary glass substrates, the surface roughness of the first and second surface areas has two different values.

Figure 2A:
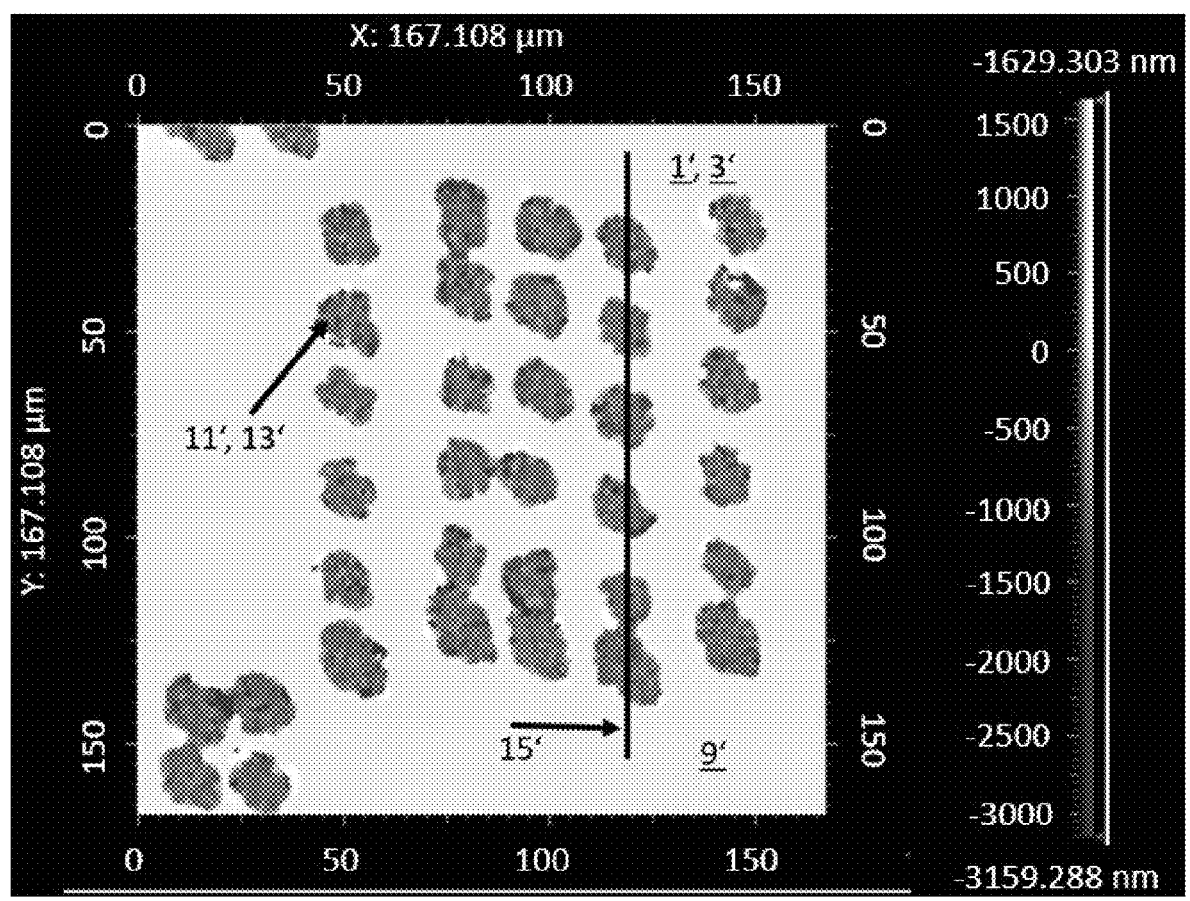
FIG. 2A shows an illustration of a magnified section of a first glass substrate having a marking element with a topographic overlay indication.

FIG. 2A shows an illustration of a magnified section of a first substrate, especially a glass substrate 1', having a marking element 3' which is in general similar to the general glass substrate and its marking element described with respect to FIGS. 1A and 1B. Hence, with respect to FIGS. 2A-2C identical structural features are denoted by the same reference numerals as used with respect to FIGS. 1A and 1B but with a single prime symbol. The image of the substrate might be obtained by white light interferometry.

The glass substrate 1' in FIG. 2A has been processed using a first laser with a first set of parameters, hence, the cavities 13' might be characteristic for this first laser and the first set of parameters used.

However, the representation of the glass substrate 1' comprises in addition also a topographic overlay which provides topographic information of the substrate surface. In other words, based on the color, it is possible to determine for each point of the image a depth relative to a reference depth so that a depth profile of the glass substrate 1' might be obtained. The unprocessed substrate surface might be set to a certain depth (such as +200 nm), hence, serving as a reference. Hence, it can be taken from FIG. 2A that the unprocessed surface area of the substrate 1', for example in the first surface area 9' where a "zero" bit is present, is of less variation (nearly constant color), while the second surface areas of the cavities 13' have a variation of the depth between −700 and −1000 nm in a central area thereof (of course, towards the borders of the cavity the depth value changes to the reference value of the unprocessed surface to which the cavity goes seamlessly into). In other words, the depth of the cavities with reference to the unprocessed surface of the substrate varies between 900 and 1200 nm at least in a central area of the respective cavity.

Figure 2B:
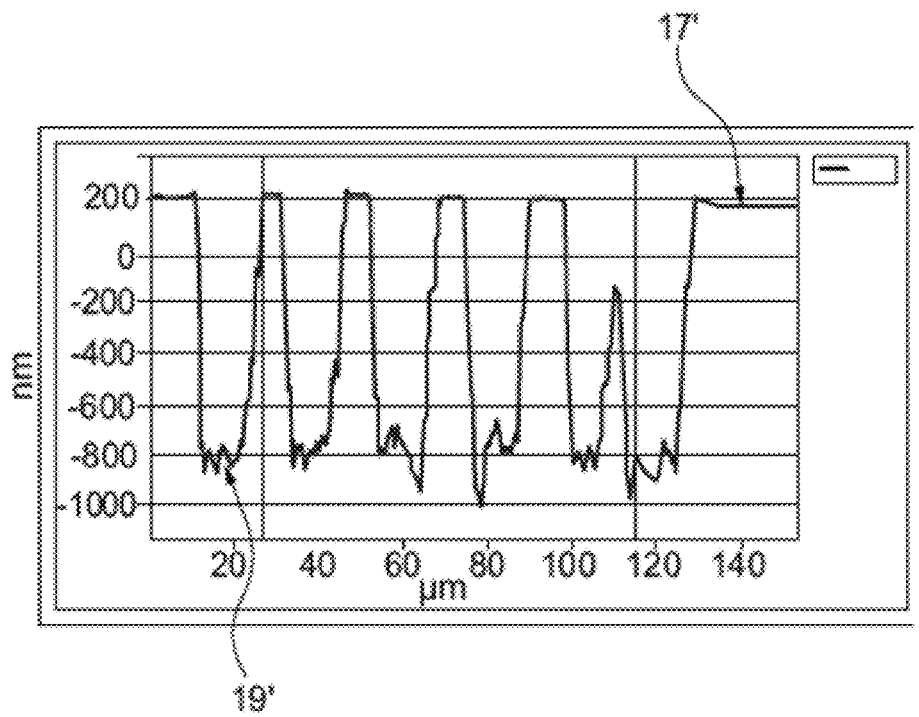
FIG. 2B shows a depth profile for the first glass substrate of FIG. 2A along the cutting line shown in FIG. 2A.

FIG. 2B shows the depth profile of the substrate along a cutting line 15' in FIG. 2A crossing at least in part a first surface area 9' and a plurality of second surface areas 11' (indeed, the cutting line 15' in FIG. 2A crosses six different second surface areas 11' since it crosses six different cavities 13', however, not all cavities and second surface areas have been labeled in the FIG.).

It is apparent from the depth profile of FIG. 2B that the depth of the substrate along a first section 17' of the depth profile corresponding to the first surface area 9' is less than the depth of the substrate along a second section 19' of the depth profile corresponding to the (most top) second surface area 11' of the (most top) cavity 13', respectively crossed by the cutting line 15'.

Of course, once the (constant) thickness of the unprocessed substrate 1' is known, the depth profile of FIG. 2B can be easily transformed into a height profile for the substrate 1'. Basically this transformation can be accomplished by simply adding an offset to the vertical axis so that the unprocessed substrate surface has a value corresponding to the thickness of the unprocessed substrate. Hence, all aforementioned evaluations made on basis of the depth profile of FIG. 2B can be made in an analogous manner based on the respective height profile as well.

An exemplary thickness of such a profile might be between 0.1 and 2 mm, such as between 0.6 and 1.7 mm.

From the depth profile of FIG. 2B the depth of at least one cavity 13' can be determined as well as the surface roughness of both, the first and second surface areas 9', 11'. Of course, it is also possible to determine the average value of the surface roughness over a plurality of cavities 13' and the average value of the depth of the cavity over a plurality of cavities 13', too.

For example, a cavity depth of 1 μm and a first roughness value of 2 nm (which is here a root mean squared value—rms value—across an area of 28131 μm$^2$ of the first surface area) and a second roughness value of 460 nm (which is here a root mean squared value—rms value—across an area of 27913 μm$^2$ of the second surface area) have been determined from the measurements of the white light interferometry (FIG. 2A) and/or the depth profile (FIG. 2B). The absolute value of the difference between the point of maximum height of the second section and the point of minimal height of the first section defines the depth value. Of course, in some embodiments, also the point of minimum height of the second section and the point of maximum height of the first section defines the depth value. Instead of a maximum or minimum value also a value averaged over the respective section might be used.

This yields to a ratio of the depth value to the second roughness value of approx. 2.2, which is within the exemplary range of values.

Of course, it is also possible to analyze the substrate by an atomic force microscope instead of a white light interferometry technique for obtaining the images of the substrate and a height/depth profile with subsequent analysis.

Figure 2C:
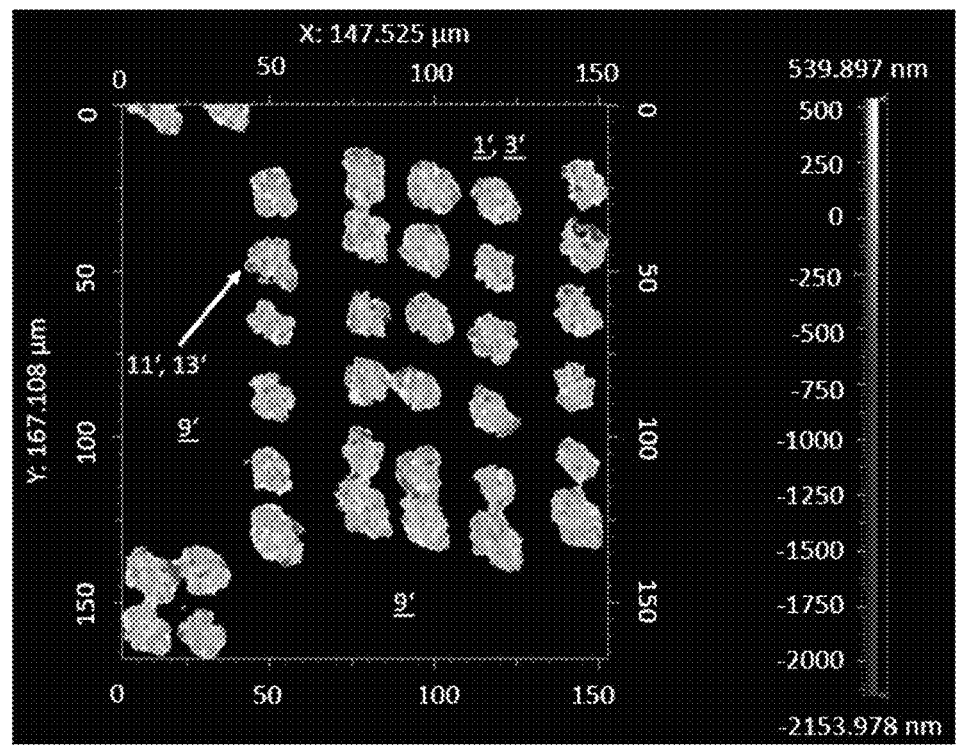
FIG. 2C shows a segmented representation of the first glass substrate of FIG. 2A.

FIG. 2C shows a segmented representation of the first glass substrate 1' shown in FIG. 2A. Based on this representation, an even more precise analysis of the second roughness value might be conducted.

The segmented representation is obtained from the representation shown in FIG. 2A in that a levelling of fourth order in combination with masking is applied to the surface areas of the substrate 1' which is free of cavities.

Next, the surface areas without cavities and borders of cavities up to a depth of 0.5 μm with respect to the surface of the substrate have been discarded. The remaining elements are bottoms of cavities 13' and borders of cavities 13' with a depth of at least 0.5 μm with respect to the surface of the substrate. In other words, from the representation of FIG.

2A only elements which are at least 0.5 μm beneath the surface of the substrate have been kept.

Next, the data has been leveled with fourth order again.

The approach employed here has been described previously in great detail. Therefore, it does not have to be repeated here in detail but reference is made to the description provided previously.

The representation of the first glass substrate 1' shown in FIG. 2A obtained this way is exemplary for assessing the second roughness value because only the bottoms (and parts of the borders) of the cavities are present. This might be regarded as a pot-like topography. From that, the roughness values might be determined more easily and more precise than with the representation of FIG. 2A (along with the height profile of FIG. 2B) since no distinct border of the cavities might be present.

For the second roughness value a root mean squared (rms) value of 200 nm is obtained based on FIG. 2C evaluation.

It is apparent that there might be different results for the rms value of the second roughness depending on the way the evaluation is conducted. More specifically, the roughness value depends on how much of the cavity is observed, i.e. it depends on the choice of the respective surface area for evaluation. Hence, by choosing an appropriate clipping, definite and comparable results can be obtained.

Figure 3:
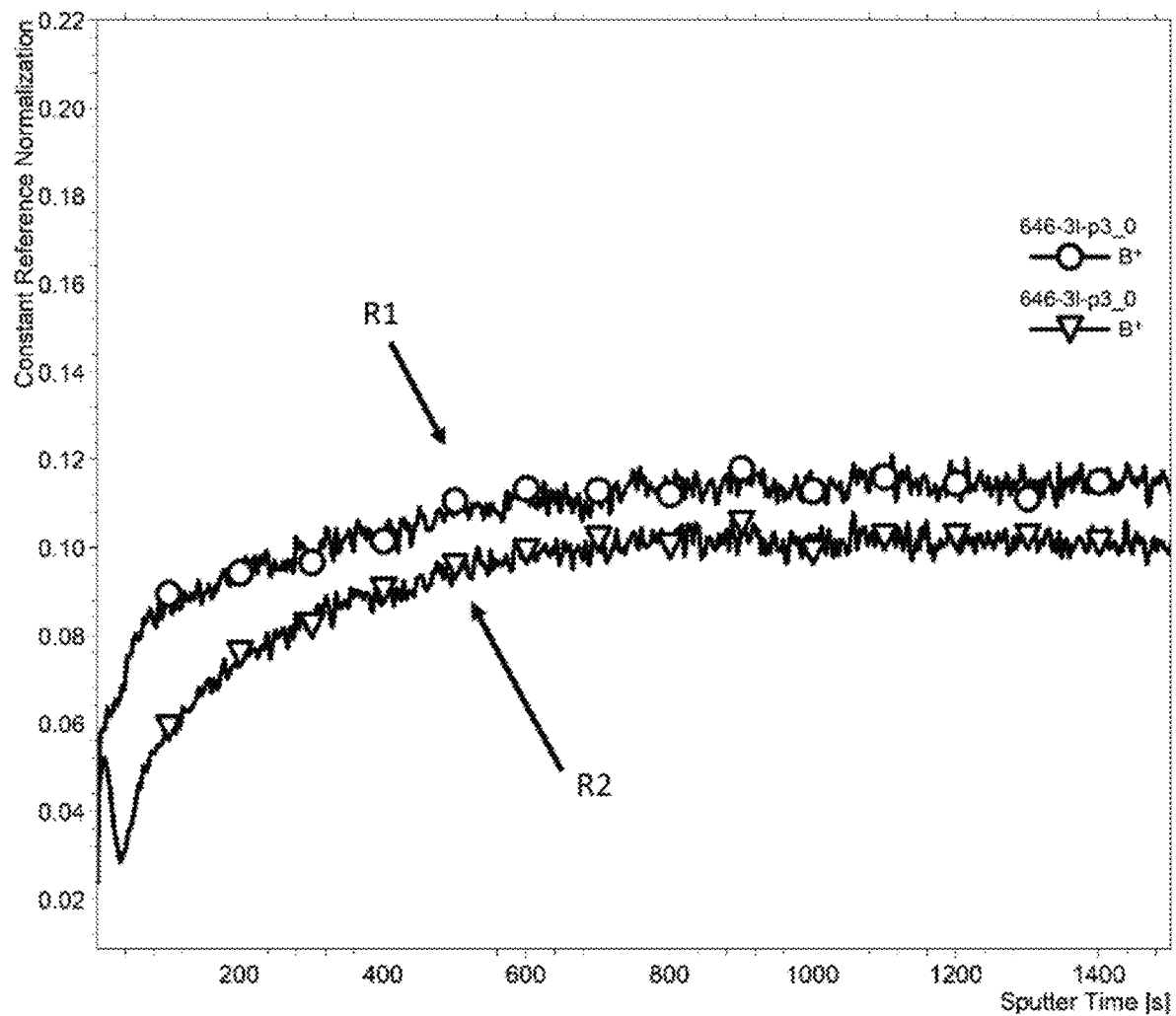
FIG. 3 shows a ToF-SIMS measurement for the first glass substrate of FIG. 2A.

FIG. 3 shows the results for a time-of-flight secondary ion mass spectrometry (ToF-SIMS) measurement conducted once within a cavity 13' of the substrate 1' shown in FIG. 2A (i.e. on a second surface area) and conducted once outside of a cavity 13' on a first surface area for different sputter times (horizontal axis of the diagram), respectively for boron (B) with reference to the concentration of silicon (Si) in the substrate at the respective measurement positions. In other words, the relative course of the boron signal is measured. On the vertical axis the respective measurement result with reference to a reference material is shown. The reference material here is silicon because it is not seriously affected by respective laser ablation techniques. Thus, the concentration of silicon is stable over the substrate. As the person skilled in the art knows, ToF-SIMS measurements only provide qualitative results but no quantitative ones.

Thus, only the relative courses of the measurement results over depth which are obtained during the sputter time can be evaluated for a single ratio of materials at a single position on the surface. But no comparison at different locations is possible. In FIG. 3 the sputter time is 1480 s.

Evaluating in FIG. 3 each of the measurement results inside the cavity (graph R1) and outside the cavity (graph R2) lead to the conclusion that the concentration of boron is larger at the outer surface than beneath the surface (both inside and outside the cavity). However, no evaluation can be made based on the relative course of R1 and R2.

In the setup used for obtaining the data of FIG. 3, a sputter time of one second corresponds approximately to 1.5 nm of depth. This means that the relative concentration obtained for boron at a sputter time of 100 seconds is the relative concentration in a depth beneath the substrate surface of 150 nm.

However, it has been found that the durability of the marking element provided according to the present invention is improved with respect to the resistance of dishwasher cycles compared to conventional marking elements which are graved in the surface. Particularly, it turned out that steam sterilization can be applied more often and to a larger extend if the marking element is designed according to the present invention.

It is assumed that the improved durability can be attributed to the fact that the variation of the measured ratio is larger outside the cavity than inside the cavity (see the larger vertical variation of graph R2 compared to the variation of graph R1, respectively, between 0 . . . 600 s). In addition, it is also observed that that the ratio represented by graph R1 reaches faster a certain limit value which seems also be beneficial with respect to an improved durability.

In other words, assuming that the relative concentration of a material in the unaffected substrate material is 1 (the relative concentration in the bulk). Then the graph R2 reaches 90% of that end concentration about 50 seconds later than the graph of R1.

Figure 4A:
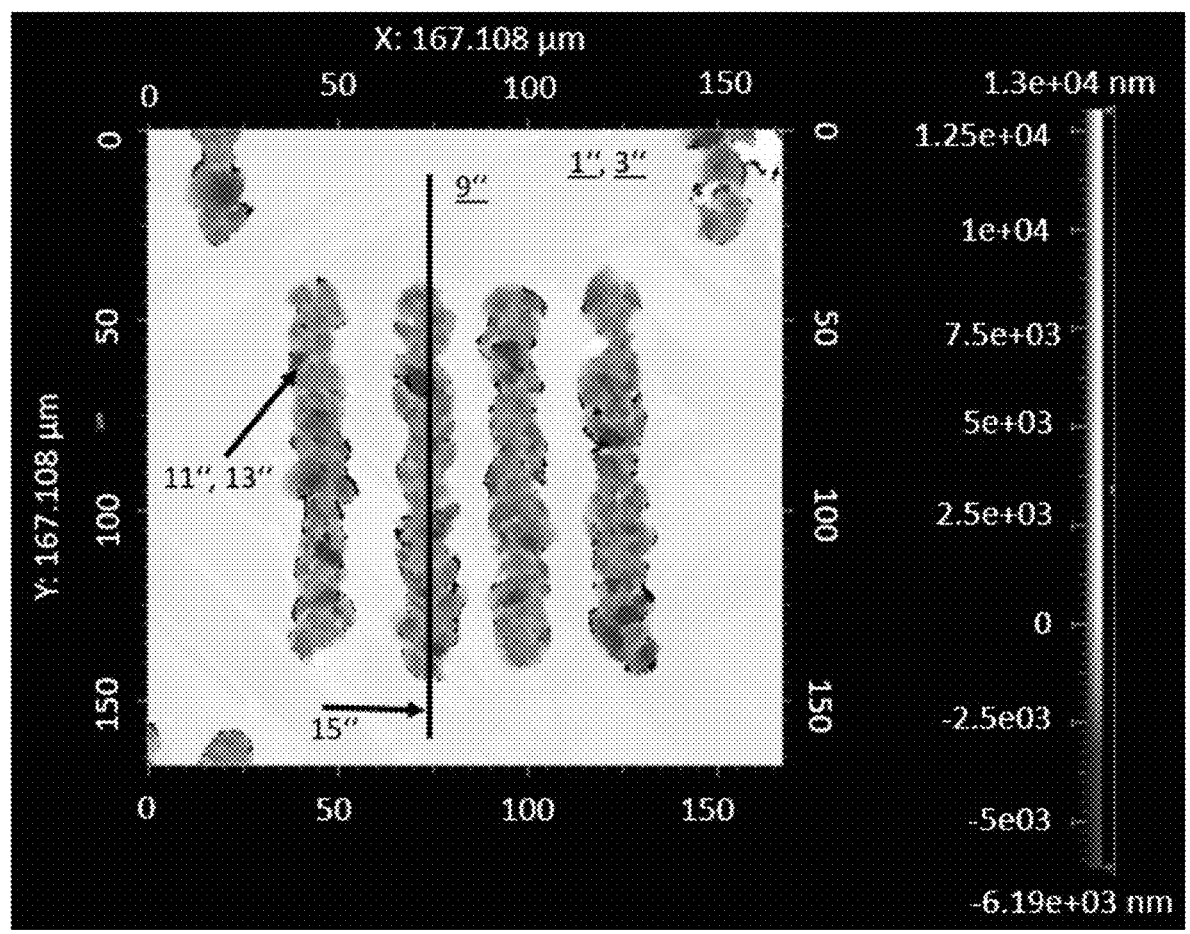
FIG. 4A shows an illustration of a magnified section of a second glass substrate having a marking element with a topographic overlay indication.

FIG. 4A shows an illustration of a magnified section of a second glass substrate, especially a second glass substrate 1", having a marking element 3" which is in general similar to the general glass substrate and its marking element described with respect to FIGS. 1A and 1B as well as to the first glass substrate 1' and its marking element described with respect to FIGS. 2A-2C. Hence, with respect to FIGS. 4A-4C identical structural features are denoted by the same reference numerals as used with respect to FIGS. 1A and 1B and FIGS. 2A-2C but with a double prime symbol. The image of FIG. 4A might be obtained by a white light interferometry technique.

The glass substrate 1" in FIG. 4A has been processed using a second laser with a second set of parameters, hence, the cavities 13" (only one is labeled in FIG. 4A) might be characteristic for this second laser and the second set of parameters used.

Figure 4B:
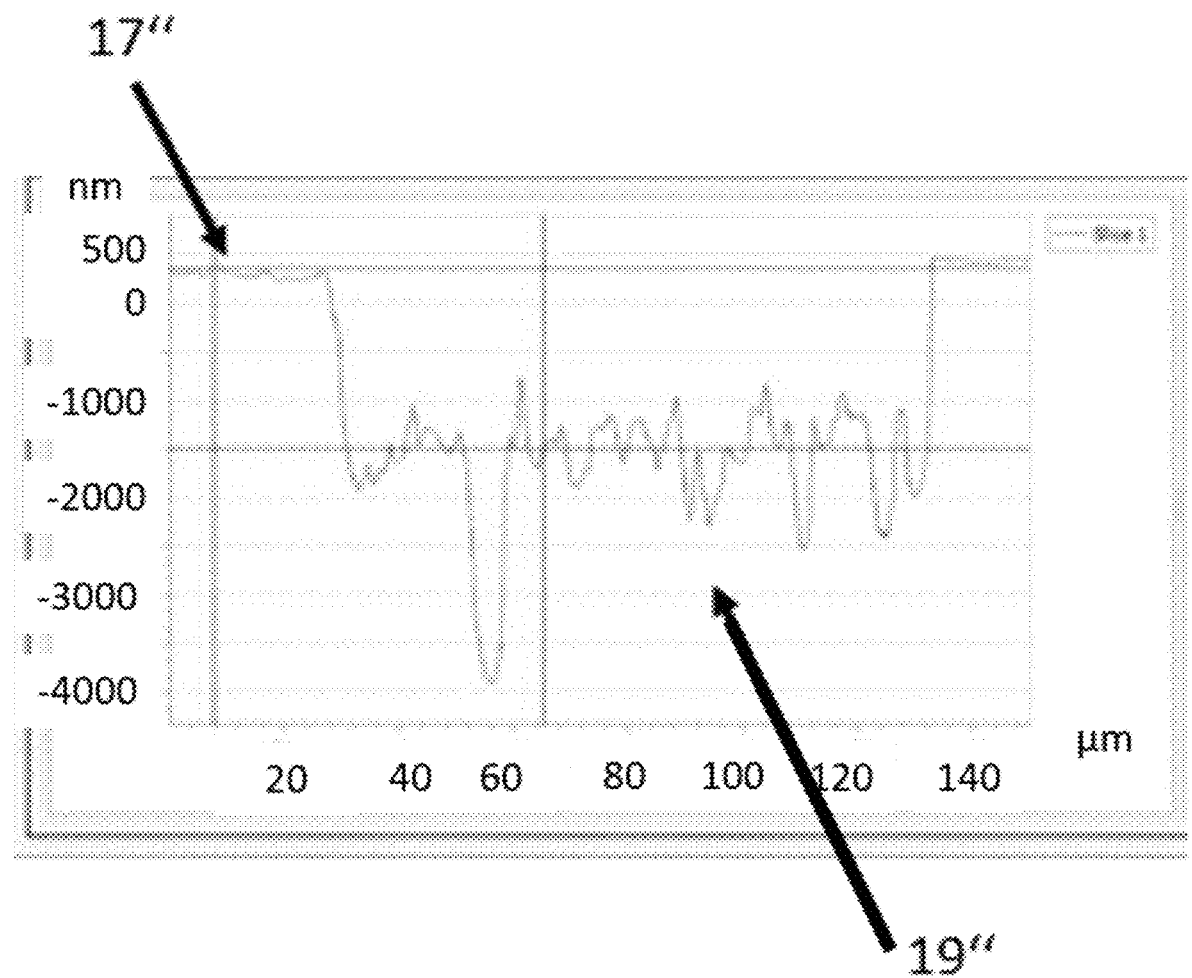
FIG. 4B shows a depth profile for the second glass substrate of FIG. 4A along the cutting line shown in FIG. 4A.
Figure 4C:
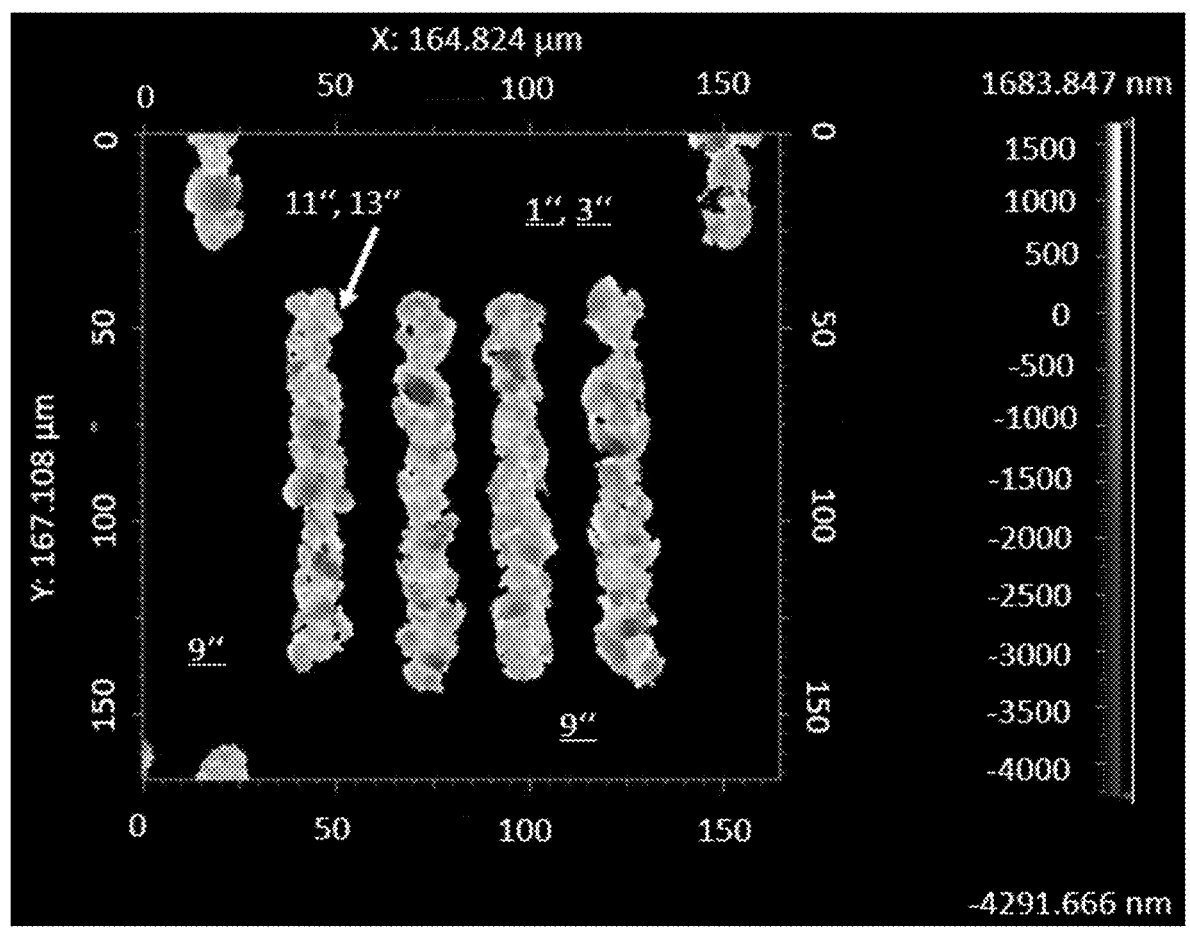
FIG. 4C shows a segmented representation of the second glass substrate of FIG. 4A.

The FIGS. 4A, 4B and 4C for the second laser corresponds in general to the FIGS. 2A, 2B and 2C for the first laser. Therefore, the general aspects are the same for the two substrates 1' and 1" obtained by processing using, respectively, the first and second laser. Therefore, only the differences between the two substrates 1' and 1" are described below.

It is apparent from FIG. 4A that due to the use of another laser (i.e. the second laser), the surface areas of the substrate 1" representing a bit "one" are produced in that four vertical lines are graved into the substrate 1". Indeed, while the first laser produced for each "one" four rows each having three cavities, the second laser so to say connects all these three cavities which yields a single vertical graved line.

Basically, nothing else changes in the general procedure. Again, FIG. 4A also comprises topographic information in form of a topographic overlay. Nothing else changes in general so that a reference can be made to the statements provided above with respect to FIG. 2A.

FIG. 4B shows the depth profile of the second glass substrate 1" along a cutting line 15" crossing at least in part a first surface area 9" and a second surface area 11" (i.e. cavity 13"). Indeed, there is only one single cavity 13" (i.e. the vertical graved line) which is crossed by the cutting line 15" even if the single cavity 13" might be produced using the second laser forming a plurality of cavities such that they are connected due to the second laser parameters.

It is apparent from the depth profile of FIG. 4B that the depth of the substrate 1" along a first section 17" of the depth profile corresponding to the first surface area 9" is less than the depth of the substrate along a second section 19" of the depth profile corresponding to the second surface area 11" of the cavity 13", respectively crossed by the cutting line 15".

Of course, once the (constant) thickness of the unprocessed substrate 1" is known, the depth profile of FIG. 4B can be easily transformed into a height profile for the substrate 1". Reference is made to the statements provided above with respect to FIG. 2B.

From the profile of FIG. 4B, the depth of the cavity 13" can be determined as well as the surface roughness of both, the first and second surface areas 9", 11". Of course, it is here also possible to determine the average value of the surface roughness over a plurality of cavities 13" and the average value of the depth of the cavity over a plurality of cavities 13", too.

For example a cavity depth of 2 µm and a first roughness value of 13 nm (which is here a root mean squared value—rms value—across an area of 5688 µm$^2$ of the first surface area) and a second roughness value of 559 nm (which is here a root mean squared value—rms value—across an area of 5794 µm$^2$ of the second surface area) have been determined from the measurements of the white light interferometry and/or the depth profile. The absolute value of the difference between the point of maximum height of the second section and the point of minimal height of the first section defines the depth value. Of course, in some embodiments also the point of minimum height of the second section and the point of maximum height of the first section defines the depth value. Instead of a maximum or minimum value also a value averaged over the respective section might be used.

This yields a ratio of the depth value to the second roughness value of approx. 3.6, which is within the exemplary range of values.

Of course, it is also possible to analyze the substrate by an atomic force microscope instead of a white light interferometry technique for obtaining a height/depth profile with subsequent analysis.

FIG. 4C shows a segmented representation of the second glass substrate shown in FIG. 4A. Based on this representation, an even more precise analysis of the second roughness value might be conducted. For details with respect to obtaining this representation, reference is made to the statements provided above with respect to FIG. 2C.

For the second roughness value a root mean squared (rms) value of 610 nm is obtained.

Again, it is apparent that defining the evaluation area properly lead to stable and reliable results with respect to the roughness values of the surfaces.

It is, thus, apparent, that employing different lasers during the manufacturing process of the marking element, leads to different characteristic contrast properties due to different properties of the geometric and/or surface properties of the substrate and/or marking element.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE SIGNS

1, 1', 1" Substrate
3, 3', 3" Marking element
5 Bit
7 Bit
9, 9', 9" Surface area
11, 11', 11" Surface area
13, 13', 13" Cavity
15', 15" Cutting line
17', 17" Section
19', 19" Section
A Area
R1 Graph
R2 Graph

What is claimed is:

1. A substrate, comprising:
   a first surface area, the substrate having a first roughness value for a surface roughness of the first surface area;
   a second surface area, the substrate having a second roughness value for a surface roughness of the second surface area, wherein in a height profile of the substrate along a cutting line crossing at least in part the first surface area and the second surface area, a height of the substrate along a first section of the height profile corresponding to the first surface area is larger than the height of the substrate along a second section of the height profile corresponding to the second surface area, the cutting line defining a line along which the height of a cross-section of the substrate is measured to define the height profile, wherein in the height profile an absolute value of a height difference between a point of maximum height or an averaged height, respectively, of the second section and a point of minimal height or an averaged height, respectively, of the first section defines a depth value, wherein a ratio of the depth value and the second roughness value is between 2 and 35; and
   a marking element extending across the first surface area and the second surface area and comprising a cavity graved into the substrate, the first surface area and the second surface area together constituting the marking element, wherein across or beneath the first surface area the substrate has a first ratio value for a ratio of concentrations of two materials present in the first surface area or in a distinct depth in the substrate beneath thereof and wherein across or beneath the second surface area the substrate has a second ratio value for a ratio of concentrations of two materials present in the second surface area or in a distinct depth in the substrate beneath thereof, wherein the two materials comprise Si and B, a concentration of B is greater in the second surface area than in the first surface area.

2. The substrate of claim 1, wherein the ratio of the depth value and the second roughness value is at least one of between 2 and 20, between 2 and 15, between 3 and 10, between 4 and 15, or between 5 and 10.

3. The substrate of claim 1, wherein first roughness value and the second roughness value are a mean surface roughness or a root mean squared surface roughness, respectively, across at least one part of the respective surface area.

4. The substrate of claim 1, wherein the first roughness value is less than a factor of 10, 20, 30, 40, 50, 60, 70, 80, 90 or 100 lower than the second roughness value and at least one of:
   the first roughness value is between 0.5 and 20 nm; or
   the second roughness value is between 5 and 1000 nm.

5. The substrate of claim 1, wherein a height value is defined by a maximum height of the first section and at least one of:
   a ratio between the height value and the depth value is between 100 and 2000; or
   the maximum height of the first section is between 0.1 and 20 mm.

6. The substrate of claim 1, wherein at least one of:
the distinct depth of each surface area is a depth of up to 2 μm beneath the respective surface area; or
the ratio of the concentrations of the two materials is at least one of obtained or obtainable by a ToF-SIMS measurement at a location of the respective surface area.

7. The substrate of claim 1, wherein the substrate comprises a glass, the glass comprising at least one of aluminosilicate glass or borosilicate glass.

8. The substrate of claim 7, wherein the substrate further comprises at least one polymer, the at least one polymer comprising at least one of cycloolefin-copolymer (COC) or cyclic olefin polymer (COP).

9. The substrate of claim 1, wherein the marking element comprises a cavity in the form of at least one of a dot-like element or a line-like element graved into the substrate; wherein at least one of:
  (i) the marking element is in the form of a matrix code;
  (ii) the first surface area at least in part does not overlap with a surface of the cavity and the second surface area is at least one part of or corresponds to the surface of the cavity;
  (iii) the first surface area is at least one part of the surface corresponding to an area of the marking element representing a bit in the marking element which is set to ZERO; or
  (iv) the second surface area is at least one part of the surface corresponding to an area of the marking element representing a bit in the marking element which is set to ONE.

10. The substrate of claim 9, wherein at least one of:
the depth value is between 0.1 μm and 4 μm; or
a maximal depth or an average depth of the cavity is between: 0.1 μm and 5 μm.

11. The substrate of claim 1, wherein the first surface area and the second surface area are at least one of directly adjacent to or connected with each other.

12. The substrate of claim 1, wherein the ratio of the depth value and the second roughness value is between 2 and 35.

13. A container, comprising:
a substrate comprising:
  a first surface area, the substrate having a first roughness value for a surface roughness of the first surface area;
  a second surface area, the substrate having a second roughness value for a surface roughness of the second surface area, wherein in a height profile of the substrate along a cutting line crossing at least in part the first surface area and the second surface area, a height of the substrate along a first section of the height profile corresponding to the first surface area is larger than the height of the substrate along a second section of the height profile corresponding to the second surface area, the cutting line defining a line along which the height of a cross-section of the substrate is measured to define the height profile, wherein in the height profile an absolute value of a height difference between a point of maximum height or an averaged height, respectively, of the second section and a point of minimal height or an averaged height, respectively, of the first section defines a depth value, wherein a ratio of the depth value and the second roughness value is between 2 and 35; and
  a marking element extending across the first surface area and the second surface area and comprising a cavity graved into the substrate, the first surface area and the second surface area together constituting the marking element, wherein across or beneath the first surface area the substrate has a first ratio value for a ratio of concentrations of two materials present in the first surface area or in a distinct depth in the substrate beneath thereof and wherein across or beneath the second surface area the substrate has a second ratio value for a ratio of concentrations of two materials present in the second surface area or in a distinct depth in the substrate beneath thereof, wherein the two materials comprise Si and B, a concentration of B is greater in the second surface area than in the first surface area.

14. The container of claim 13, wherein the ratio of the depth value and the second roughness value is between 3 and 35.

* * * * *